United States Patent [19]

Stanley et al.

[11] Patent Number: 4,823,977
[45] Date of Patent: Apr. 25, 1989

[54] ABANDONING PLUG FOR HOSE NOZZLE

[75] Inventors: Mervin D. Stanley, Stonington; Joseph L. Daghe, Decatur, both of Ill.

[73] Assignee: Mueller Co., Decatur, Ill.

[21] Appl. No.: 215,787

[22] Filed: Jul. 6, 1988

[51] Int. Cl.⁴ .............................................. B65D 45/00
[52] U.S. Cl. ..................... 220/243; 220/251
[58] Field of Search ........................ 220/243, 251, 314

[56] References Cited

U.S. PATENT DOCUMENTS

| 446,151 | 2/1891 | Munroe. | |
|---|---|---|---|
| 629,829 | 8/1899 | Tidemann. | |
| 703,268 | 6/1902 | Huston. | |
| 888,255 | 5/1908 | Osborne | 220/243 |
| 1,060,693 | 5/1913 | Mueller | 220/251 |
| 1,349,510 | 8/1920 | Jochumsen. | |
| 1,449,729 | 3/1923 | Cain. | |
| 1,490,869 | 4/1924 | Volz. | |
| 1,612,749 | 12/1926 | Smith | 220/243 |
| 1,992,431 | 2/1935 | Key. | |
| 2,522,057 | 9/1950 | Owens | 220/243 |
| 2,703,670 | 3/1955 | Voight. | |
| 3,094,238 | 6/1963 | Davidson. | |
| 3,370,742 | 2/1968 | Reardon. | |
| 3,391,817 | 7/1968 | Shaw. | |
| 3,874,550 | 4/1975 | Gordon. | |
| 3,902,625 | 9/1975 | Schmidhuber. | |
| 4,096,968 | 6/1978 | Treiber et al.. | |
| 4,179,038 | 12/1979 | Rosan, Jr.. | |
| 4,465,039 | 8/1984 | Snelgrove et al. | 220/243 X |

FOREIGN PATENT DOCUMENTS 0580536  8/1958  Italy ..................................... 220/243

Primary Examiner—Stephen Marcus
Assistant Examiner—Nova Stucker
Attorney, Agent, or Firm—Cushman, Darby & Cushman

[57] ABSTRACT

An abandoning plug assembly for sealing off fire hydrant ports including inner and outer retainers with a fastener connected therebetween. The inner retainer being reversible between two positions so that the assembly can accommodate port barrels of varied length using a fastener of a single length.

6 Claims, 4 Drawing Sheets

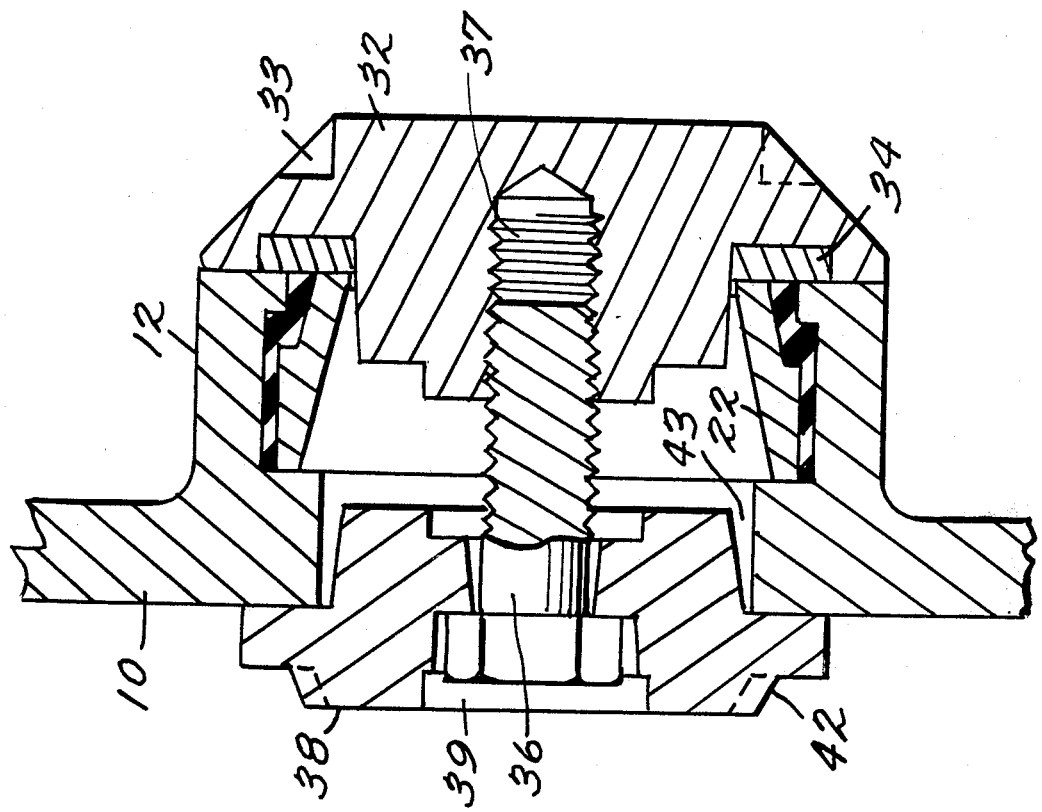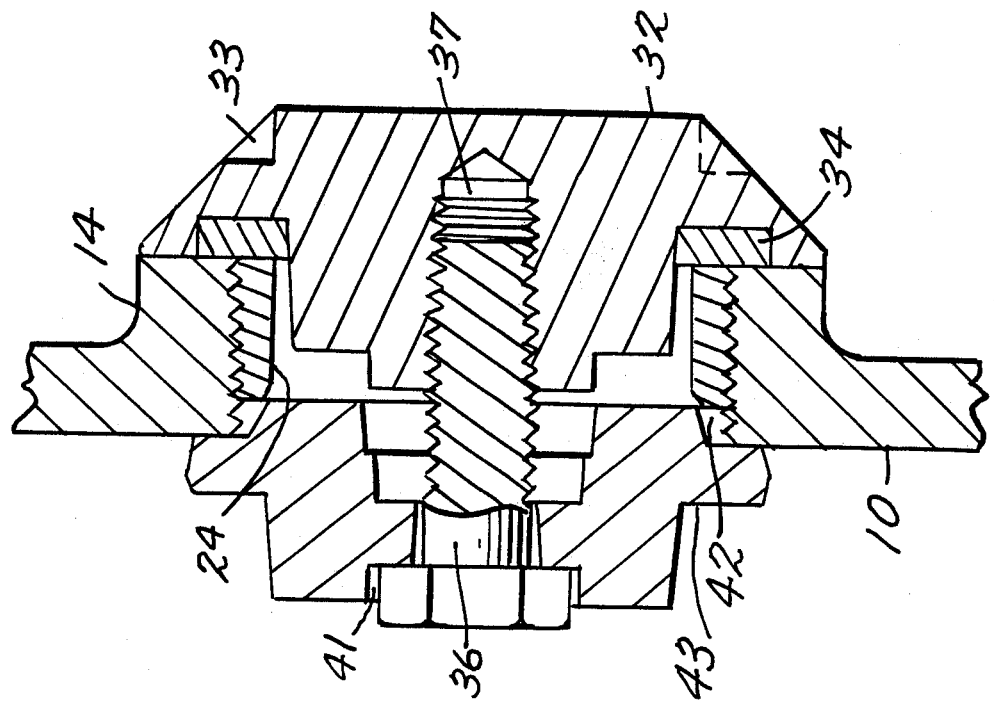

ABANDONING PLUG FOR HOSE NOZZLE

FIELD OF THE INVENTION

The present invention relates to the field of pressurized water distribution and apparatus for closing off certain distribution passages. More particularly, the present invention is directed towards an abandoning plug for fire hydrant hose nozzles of alternate configuration.

BACKGROUND OF THE INVENTION

Municipal water distribution systems are subject to design and installation according to the specifications in use by a given municipality. Often times, the specifications are changed over the course of several years owing to gradual improvements or changes in the state of the art.

An example of changing specifications and improving methods of water distribution is the field of fire hydrants. Although the prior art contains several types of fire hydrants, the majority of prior art hydrants exist in two-way or three-way configurations. A two-way configuration includes two hose nozzles while a three-way configuration includes two hose nozzles and a larger pumper nozzle. Occasionally a fire hydrant may comprise only a single large pumper nozzle.

There exist several reasons to choose between the various configurations available in fire hydrants. The choice of configuration is usually dependent upon the available fire equipment and the chosen method of distributing water from the hydrant source. Further, with an increased number of available nozzle ports on a hydrant, the likelihood that the ports will be tampered with by vandals is also increased.

Owing to the changing concerns and design specifications of municipalities, the distribution configuration of existing in place hydrants occasionally needs altering. The hydrants are usually modified to decrease the number of available ports on the hydrant. As such, reliable methods of shutting off one or more ports on the hydrant are required so that the hydrant is securely sealed from within and is substantially tamper-proof from the outside.

The present invention provides a single adaptable apparatus whereby varying fire hydrant configurations can be satisfactorily sealed. In this manner, hydrants which include different nozzle types and designs can be sealed in a cost efficient and timely manner. The plug assembly of the present invention is advantageously more cost efficient than conventional plug assemblies owing to reversibility and interchangeability of parts.

SUMMARY OF THE INVENTION

The present invention comprises a pair of inner and outer retainers with a fastener connecting between them. The outer retainer is generally circular in configuration and includes a threaded receiver on an inside surface of the retainer. The inner retainer of the assembly is a reversible bar-shaped element which enables the entire assembly to accommodate hydrant ports of varying configuration.

The inner retainer is reversible and presents a deep set seat for the connecting fastener head on one side and a shallower seat for the fastener head on the reversed side. In this manner, the assembly according to the present invention is able to accommodate hydrant ports having varied nozzle barrel lengths by simply reversing the seating position of the inner retainer.

Other objects, features, and advantages of the present invention will be apparent from the following detailed description of preferred embodiments taken in conjunction with the accompanying drawing in which:

BRIEF DESCRIPTION OF THE DRAWINGS

FIG. 10 is a cross-sectional view of the abandoning plug according to the present invention in place in a threaded hose nozzle hydrant port.

FIG. 11 is a cross-sectional view of the abandoning plug according to the present invention in place in a leaded-in nozzle hydrant port with the inner retainer reversed from the position shown in FIG. 10.

DETAILED DESCRIPTION OF THE PREFERRED EMBODIMENT

The abandoning plug according to the present invention will be described with reference to drawing FIGS. 1–11 as described above.

Figure 1:
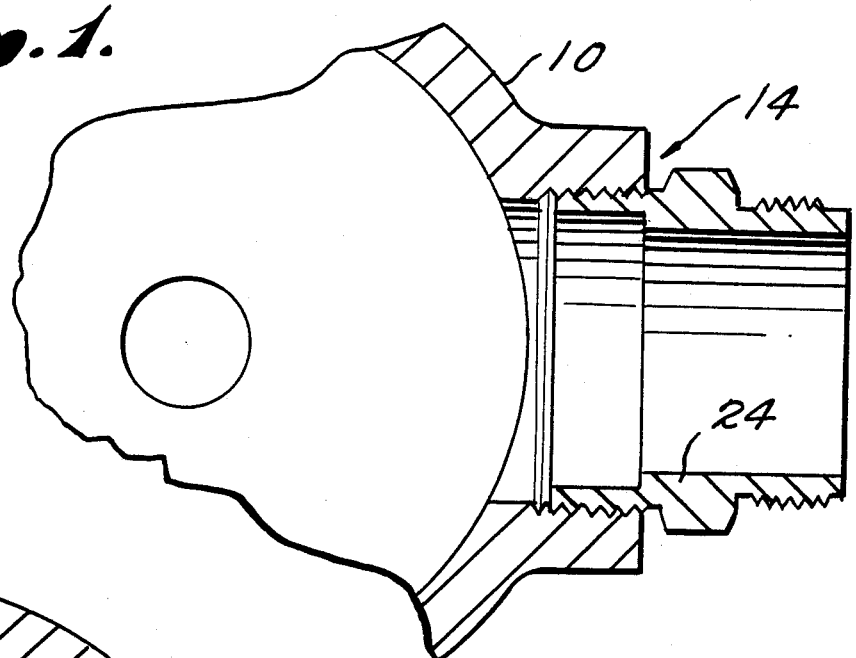
FIG. 1 is a cross-sectional view of a fire hydrant with a threaded hose nozzle in place.

FIG. 1 shows the fire hydrant 10 including a threaded short barrel port 14. A threaded nozzle 24 is shown threaded into the barrel portion 14 and enables the attachment of a hose to the hydrant.

Figure 2:
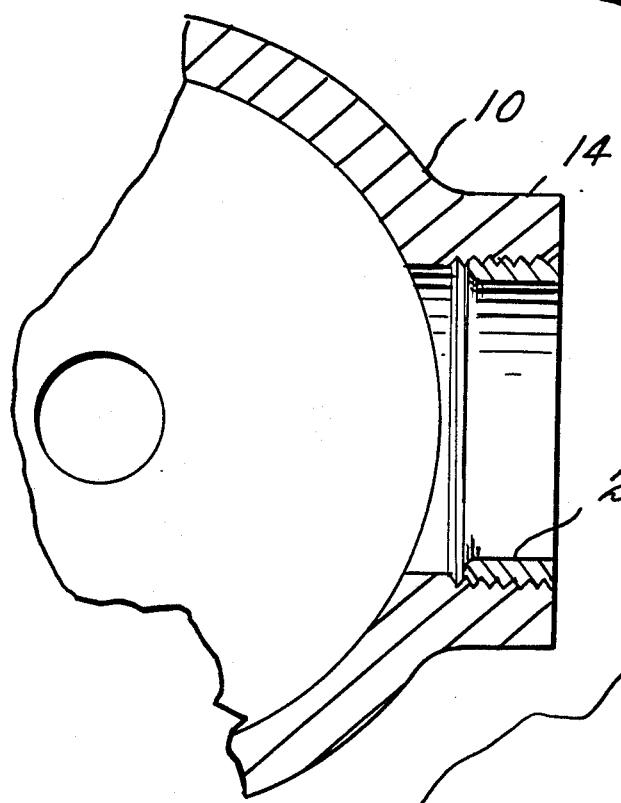
FIG. 2 is a fire hydrant with a threaded in hose nozzle cut off flush with the face of the hydrant port.

When abandonment of the hose nozzle is desired, the hose nozzle is cut off flush with the face of the hydrant port. This flush cut is shown in FIG. 2. The inner threaded portion of the nozzle remains in place with the exteriorly extended portion of the nozzle having been cut off.

Figure 3:
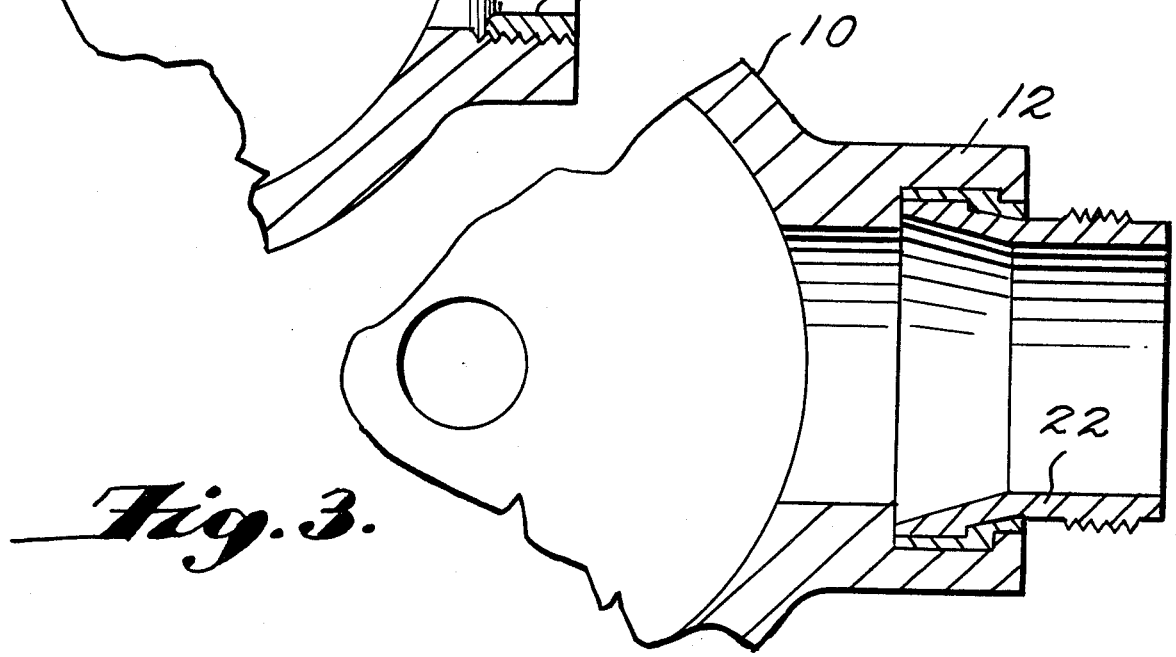
FIG. 3 is a fire hydrant with a leaded-in hose nozzle in place.

FIG. 3 shows a hydrant 10 with a long barrel port configuration 12. The long barrel type of port is usually associated with a leaded in nozzle 22. The nozzle is located within the extended barrel and is sealed in place by the addition of lead in the annular gap existing between the barrel 12 and the nozzle 22.

In a manner similar to that disclosed for the abandoning of a threaded short barrel port, the extended barrel abandoning method includes the cutting of the leaded in nozzle flush with the face of the extended barrel port. This cut configuration is shown in FIG. 4.

Figure 4:
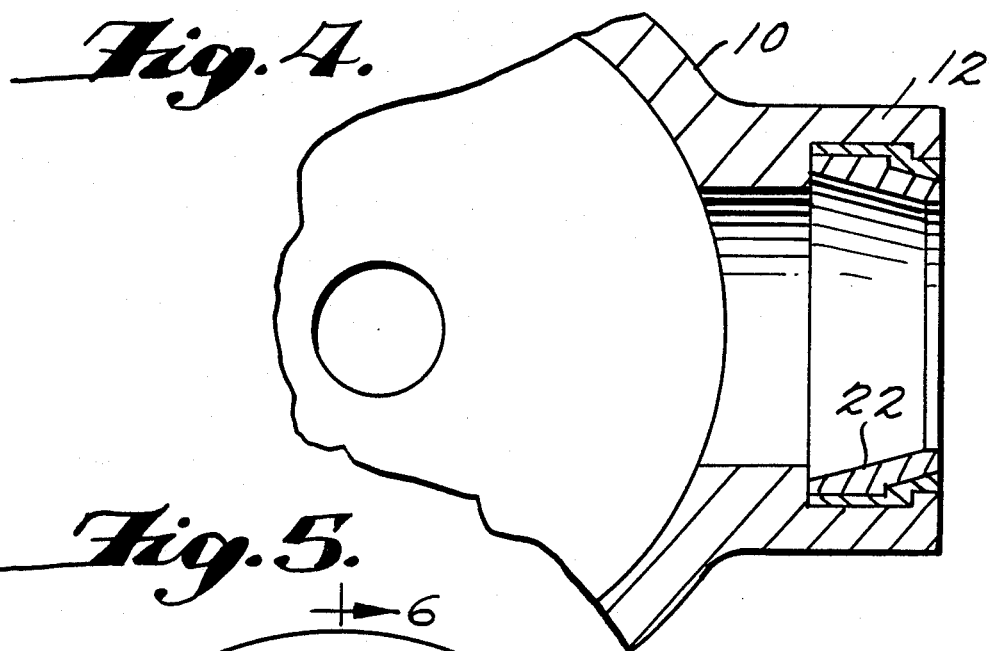
FIG. 4 is a fire hydrant with a leaded-in hose nozzle cut off flush with the face of the hydrant port.

FIGS. 2 and 4 show the hydrant ports in their respective prepared configurations for abandonment. Once the respective nozzles have been cut flush with the faces of the hydrant ports, a cap 32 is placed over the outer ends of the barrels and is firmly retained against the outer rim of the hydrant barrel.

Figure 5:
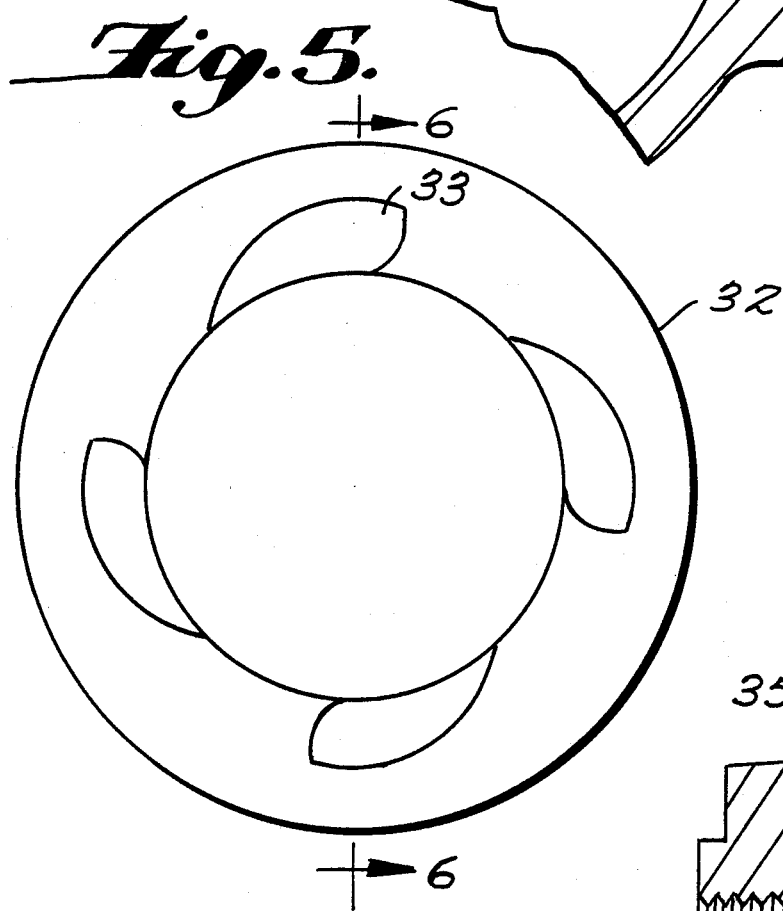
FIG. 5 is a plan view of an outer retainer of the abandoning assembly according to the present invention.
Figure 6:
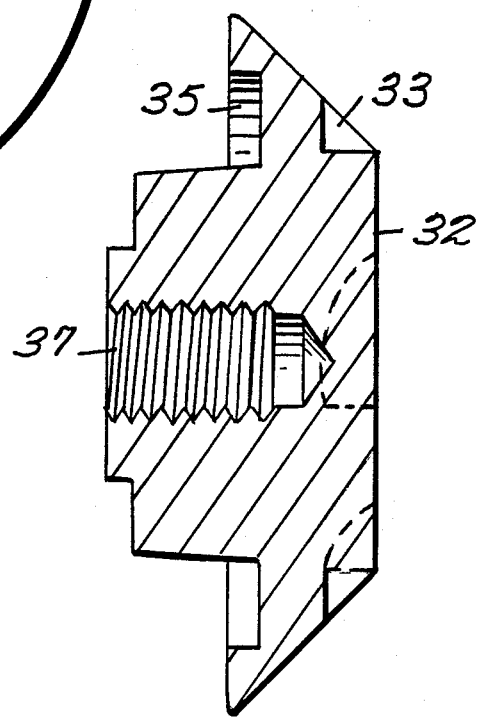
FIG. 6 is a cross-sectional view of the outer retainer shown in FIG. 5 along line 6—6.

FIG. 5 is a top plan view of an outer retainer 32 of the present abandoning plug assembly. The outer retainer includes one-way securing slots 33 which enable the outer retainer to be threaded onto an inner fastener in a single direction. The slots 33, owing to their one-way configuration, inhibit the removal of the outer retainer by reverse rotation.

Outer retainer 32 includes a groove 35 which receives a circular seal member 34. In this manner, as the outer retainer member is tightened against the outer rim of an abandoned hydrant barrel, the outer rim of the barrel engages the seal 34 and seals the port.

The outer retainer 32 is also equipped with an inner threaded portion 37 for receiving a connecting fastener 36 (shown in FIGS. 10 and 11). The threaded fastener 36 securely retains the outer retainer 32 against the peripheral outer rim of the hydrant barrel.

Figure 7:
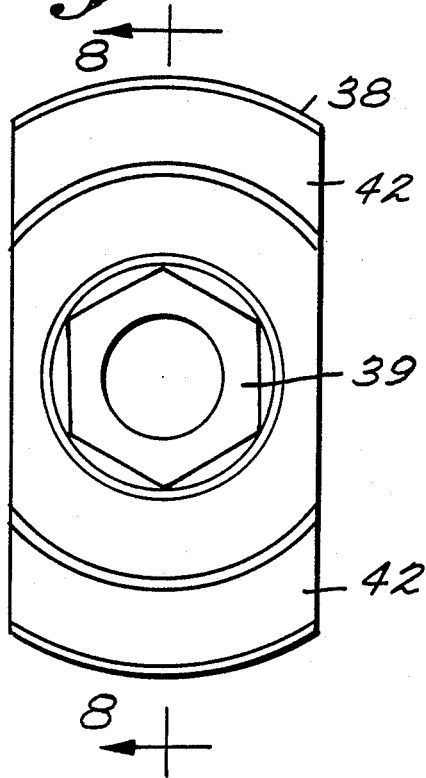
FIG. 7 is a top plan view of the reversible inner retainer of the abandoning plug assembly of the present invention.
Figure 8:
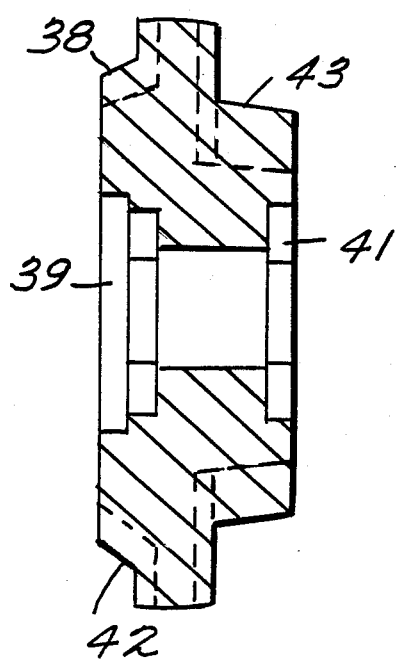
FIG. 8 is a cross-sectional view of the abandoning plug inner retainer shown in FIG. 7 along line 8—8.
Figure 9:
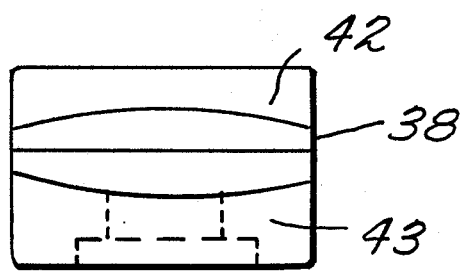
FIG. 9 is an end view of the abandoning plug inner retainer shown in FIG. 8.

FIGS. 7, 8, and 9 show the reversible inner retainer 38 of the present abandoning plug assembly. The inner retainer includes recesses 39 and 41 located on opposite sides of the reversible retainer. These recesses 39 and 41 accommodate and seat the head of a connecting threaded fastener 36. The recesses also positively engage the head of a fastener so as to prevent the fastener from rotating when the respective inner and outer retainers of the abandoning plug assembly are tightened together.

The reversible retainer 38 also includes end notches 42 and 43 which are alternately shallow and deep depending on which side of the reversible retainer is chosen to face the inner end of an abandoned barrel. The inner retainer 38 incorporates a deep recess 39 on one side of the retainer for receiving the head of a fastener in combination with deep end notches 43 on the opposite side of the retainer. In this manner, as shown in FIG. 11, the inner retainer may seat deeply into the inner end of an abandoned barrel and enable the fastener to extend further within the abandoned barrel.

When reversed, the inner retainer incorporates a shallow recess 41 for receiving the fastener head in combination with shallow end notches 42 on the opposite side of the retainer. In this reversed configuration, the fastener is seated in a setback manner with respect to the barrel entrance.

The end notches 42 and 43 of the inner retainer 38 are also radiused to generally match the curvature of the cylindrical center bore of the hydrant. In this manner, when the outer retainer is tightened the radiused end notches 42 and 43 of the inner retainer are urged into the respective curved portions of the barrel inner end and are thus prevented from further rotating.

FIG. 10 shows a cross-sectional view of a plug assembly according to the present invention positioned in a short threaded nozzle barrel 14. The inner retainer 38 is positioned in the shallow position (shallow end notches 42 positioned against barrel inner rim and the head of fastener 36 in shallow recess 41) so that the assembly can accommodate the short threaded barrel dimensions. The shallow notches 42 of the retainer 38 are engaged on the inner edges of the barrel and, in combination with the shallow recess 41 for receiving the head of the fastener, enable the fastener to be inserted into the barrel an appropriate length to securely engage outer retainer 32.

FIG. 11 shows an abandoning plug according to the present invention inserted in a long barrel leaded nozzle port 12 of a hydrant 10. The inner retainer is positioned so that the deeply recessed side 39 of the retainer 38 receives the head of the fastener 36. The corresponding and oppositely positioned deep end notches 43 in the retainer engage the inner sides of the barrel. This reversed positioning of the inner retainer 38 enables the fastener 36 to extend substantially further into the extended barrel as opposed to the configuration shown in FIG. 10. In this manner, a standard length fastener is able to securely attach the inner and outer retainer members in both short and long barrel hydrant ports.

As described, the abandoning plug assembly according to the present invention is adaptable to successfully plug hydrant ports of varying length dimensions. An operator must only choose which side of the inner retainer is best suited to the particular port configuration which is to be abandoned. When an operator has determined whether the port barrel is a long or short design, the inner retainer is appropriately oriented (either the shallower deep recess is chosen) and a fastener inserted therein. The fastener and retainer combination is then inserted through the exterior side of the hydrant port and positioned so as to engage the inner edges of the barrel. An outer retainer member including the seal is then threaded onto the fastener and tightened by a tool which engages securing slots 33. The outer retainer is tightened until it is suitably snug against the hydrant barrel rim. The tightening of the outer retainer may result in some rotation of the inner retainer until the inner retainer is sufficiently seated into the curved portions of the hydrant barrel inner end. Hence, complete tightening of the abandoning plug is possible by merely continued tightening of the outer retainer.

It will now be apparent to those skilled in the art that other embodiments, improvements, details, and uses can be made consistent with the letter and spirit of the foregoing disclosure and within the scope of this patent, which is limited only by the following claims.

What is claimed is:

1. An abandoning plug assembly for a nozzle barrel comprising:
    outer cap means for covering an outer end of a nozzle barrel,
    reversible inner retainer means for engaging an inner end of the nozzle barrel,
    fastener means for connecting and drawing together said inner retainer and outer cap means,
    said reversible inner retainer means having opposite sides of alternate configuration wherein each of said opposite sides is adapted to receive said fastener means to a different seating depth within said reversible inner retainer means.

2. An abandoning plug assembly as in claim 1, wherein:
    said fastener means comprises a threaded bolt having a polygonally shaped head adapted to be received in said retainer means.

3. An abandoning plug assembly as in claim 2, wherein:
    a first side of said opposite sides has a shallow recess for receiving said fastener head and a second of said opposite sides has a deeper recess for receiving said fastener head.

4. An abandoning plug assembly as in claim 3, wherein:
    said outer cap means includes a peripheral seal for sealingly engaging a rim of the nozzle barrel when said outer cap means and said inner retainer means are drawn together by said fastener means.

5. An abandoning plug as in claim 3, wherein:

said reversible inner retainer means is bar shaped and said opposite sides thereof each have notches on respective ends of said inner retainer means, said notches on a single side being either shallow or deep in correspondence with the deep or shallow fastener head receiving recesses respectively.

6. An abandoning plug as in claim 5, wherein:
each of said notches includes a surface for engaging an inner rim of the nozzle barrel, said surface being curved so as to match the inner curvature of a body on which the nozzle barrel is attached.

* * * * *